United States Patent
Miller et al.

(10) Patent No.: US 7,466,801 B2
(45) Date of Patent: Dec. 16, 2008

(54) METHOD AND APPARATUS FOR PRESENTING CALLER IDENTIFICATION INFORMATION WITH GEOGRAPHICAL AND/OR SOURCE LANGUAGE INFORMATION

(75) Inventors: Brent Alan Miller, Cary, NC (US); Steven Michael Miller, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 773 days.

(21) Appl. No.: 10/686,276

(22) Filed: Oct. 15, 2003

(65) Prior Publication Data
US 2005/0084078 A1    Apr. 21, 2005

(51) Int. Cl.
*H04M 1/64* (2006.01)
(52) U.S. Cl. .............. 379/88.06; 379/142.01; 379/201.12; 379/265.12
(58) Field of Classification Search ......... 379/67.1, 379/88.06, 142.01, 201.12, 265.12; 704/240; 705/37
See application file for complete search history.

(56) References Cited
U.S. PATENT DOCUMENTS

| | | | |
|---|---|---|---|
| 5,440,615 A | 8/1995 | Caccuro et al. | 379/67 |
| 5,509,060 A | 4/1996 | Hall et al. | 379/207 |
| 5,771,283 A | 6/1998 | Chang et al. | 379/142 |
| 5,787,159 A | 7/1998 | Hamilton et al. | 379/201 |
| 5,835,568 A | 11/1998 | Bass et al. | 379/67 |
| 5,841,852 A | 11/1998 | He | 379/201 |
| 5,878,124 A | 3/1999 | Griesmer et al. | 379/201 |
| 6,069,939 A * | 5/2000 | Fung et al. | 379/67.1 |
| 6,240,170 B1 | 5/2001 | Shaffer et al. | 379/142 |
| 6,535,596 B1 * | 3/2003 | Frey et al. | 379/201.01 |
| 6,597,765 B1 * | 7/2003 | Ksiazek | 379/88.06 |
| 2002/0174059 A1 * | 11/2002 | Guo | 705/37 |
| 2003/0007625 A1 * | 1/2003 | Pines et al. | 379/223 |
| 2004/0204940 A1 * | 10/2004 | Alshawi et al. | 704/240 |

* cited by examiner

*Primary Examiner*—Gerald Gauthier
(74) *Attorney, Agent, or Firm*—Duke W. Yee; Martin J. McKinley; Wayne P. Bailey

(57) ABSTRACT

A method for processing calls. Initiation of a call by a user is detected in the communications device. In response to detecting the call, a geographic identification based on a number assigned to the communications device and/or language identification based on a user of the communications device is identified. The geographic identification and the language identification are transmitted with caller identification information for use by a called party.

12 Claims, 4 Drawing Sheets

METHOD AND APPARATUS FOR PRESENTING CALLER IDENTIFICATION INFORMATION WITH GEOGRAPHICAL AND/OR SOURCE LANGUAGE INFORMATION

BACKGROUND OF THE INVENTION

1. Technical Field

The present invention relates generally to an improved data processing system and in particular to a method and apparatus for transmitting data. Still more particularly, the present invention relates to a method, apparatus, and computer instructions for transmitting geographical and/or source language information.

2. Description of Related Art

Caller identification (CID), also referred to as caller number delivery (CND), is an extension of automatic number identification (ANI), which is used by telephone companies to identify a billing account for a toll call. Caller ID information is transmitted using frequency shift keyed (FSK) modem tones. The caller ID information displayed to a user typically includes a telephone number and/or the name of the calling party. In this manner, a telephone user is able to identify a party prior to answering a call.

This type of information is particularly useful with some businesses in which multilingual voice calls are common. In some cases, the person answering a phone speaks more than one language, but does not know the language of the caller. Through caller identification information, a user may be able to approximately identify the geographic location of a calling party based on the telephone number presented in the caller ID information. This information is useful to a limited extent. A user may be able to use the telephone number from the calling party to identify a location from which the call originates if the user can translate the number into the geographic region. This system, however, is inefficient because it requires the user to identify the geographic location of the caller based on the phone number. Moreover, in some cases, particularly some international calls, the caller ID information that is transmitted to the receiving party may be insufficient to identify the geographic location of the caller. When a call is received, the user has only a short period of time to answer the call. As a result, identifying the geographic location of the caller from the telephone number is often impractical.

Therefore, it would be advantageous to have an improved method, apparatus, and computer instructions for identifying a location of a calling party when a call is received. It would be additionally advantageous to have an improved method, apparatus, and computer instructions for identifying the language(s) spoken by a calling party when a call is received.

SUMMARY OF THE INVENTION

The present invention provides a method for processing calls. Initiation of a call by a user is detected in the communications device. In response to detecting the call, a geographic identification based on a number assigned to the communications device and/or language identification based on a user of the communications device is identified. The geographic identification and the language identification are transmitted with caller identification information for use by a called party.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
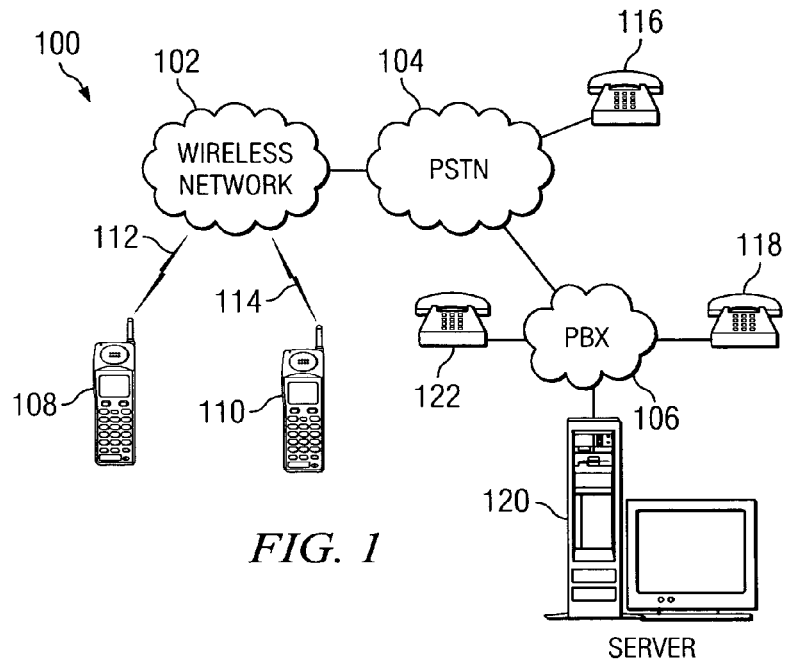
FIG. 1 is a diagram of a communications system in which the present invention may be implemented.

With reference now to the figures and in particular to FIG. 1, a diagram of a communications system is depicted in which the present invention may be implemented. Communication system 100 includes wireless network 102, public switched telephone network (PSTN) 104, and private branch exchange (PBX) 106. Wireless network 102 may provide communications for mobile communications units through various protocols, such as code division multiple access (CDMA) or time division multiple access (TDMA).

In these examples, mobile communication units 108 and 110 may receive and originate calls with other users through wireless communication links 112 and 114. These calls may be made to other wireless mobile units or to LAN line telephones in public switched telephone network 104. For example, a call may be initiated between mobile unit 108 and telephone 116 or telephone 118 in private branch exchange 106.

Within communications network 100, caller ID information may be sent using SS7, which is a protocol used to handle setup, termination, supervisory data, and other data regarding a voice call. Caller party number message (CPNM) is a message containing calling information, such a calling party's telephone number and whether or not the call is to be blocked. This type of messaging is used to send caller ID information. Caller ID information encompasses more than one type per caller identification.

In these examples, caller number delivery (CND) is delivered in single data message format and contains the date, time, and calling number. Caller name delivery (CNAM) is an enhancement to CND and adds the calling name. This information is sent in multiple data message format, which contains the date, time, calling number, and the name associated with the calling number.

The illustrative examples of the present invention supplement the presently available caller ID information with geographic and/or language information. In the depicted examples, standard, well accepted character country codes and language codes may be used. The country code may be added to the caller ID information based upon the country from which the call is being placed or by some other learned behavior or user setting. In this manner, the geographic origin of the call may be determined and displayed by the caller ID equipment.

Further, in the illustrative examples, it is possible that the caller does not speak the language of the country from which the call originates. For example, a user may be located in Japan but speaks English.

Additionally, in some cases, more than one language is commonly spoken in a particular geographic location or country. A personal profile may be stored on a personal device, such as a smart card used in a mobile phone or through a Bluetooth device connected to a phone with Bluetooth wireless communication capability. Bluetooth is a trademark of the Bluetooth Special Interest Group, Inc. The different languages spoken by a caller may be stored in the profile. Through this profile in the illustrative examples, the preferred speaking language of the caller may be stored. When the caller originates a call, this information may be used to transmit spoken languages as well as the originating country code.

Thus, a called party may be able to identify the geographic origination of a caller as well as languages that are spoken by the caller prior to answering the call. For example, a user at mobile communications unit 108 may be located in Germany, but speaks French and calls a user at telephone 118, who is located in New York. When the call is initiated, mobile communications unit 108 may send an originating country code for Germany, such as GE, and a language code for languages spoken by the user, such as FR in this case.

This information, along with other caller identification information is transmitted to telephone 118 in initiating the call. Telephone 118 displays the originating country as Germany and the caller's spoken language as French. In the depicted examples, these country codes are translated into the words. For example, GE becomes Germany, while FR becomes French on the caller ID display. In this manner, the called party at telephone 118 is able to know the originating country and spoken language of the calling party.

As a further enhancement, telephone 118 may contain a profile as to languages spoken by the user at that device. The language information transmitted with the caller id information may be compared to languages spoken by the user at telephone 118 to see whether a match is present. If a match is not present, intelligent call routing may be used to route the call to another user or translator. This intelligent call routing may be provided through processes on server 120 within PBX 106 in these examples. For example, if the called party does not speak French, the call may be automatically routed to another person who does speak French, such as a person at telephone 122. This person may help the caller at mobile communications unit 108 directly or provide translation services for the called party at telephone 118.

In this manner, a person receiving a call can, with some degree of certainty, know the languages the caller speaks. As a result, if the called party speaks that language, the called party may answer in the appropriate language. In the case in which the caller and the called party do not have a common spoken language, intelligent call routing may be used to re-route the call to another party for help with translation of the call. Further, computer based translation also may be implemented to automatically translate the call into the appropriate language for each party. An example of translation system includes Altavista's "Babelfish" service translates text and which may be used in conjunction with speech-to-text and text-to-speech products such as ViaVoice, which is available from International Business Machines Corporation. Another example is Ectaco translation software, which provides for a voice to voice translation from one language to another language. This software is available from Rendaxa Software AS.

Figure 2:
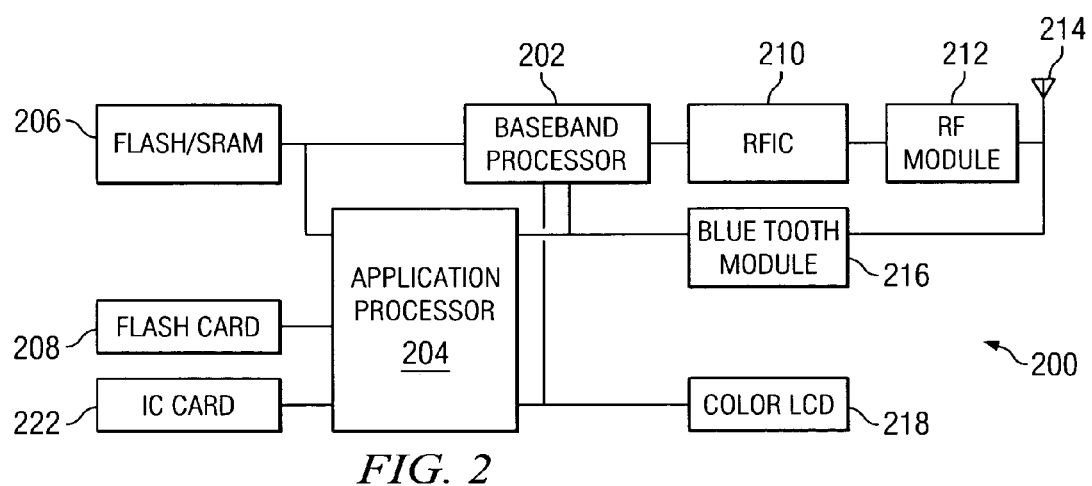
FIG. 2 is a block diagram of a mobile communications unit in accordance with a preferred embodiment of the present invention.

Turning next to FIG. 2, a block diagram of a mobile communications unit is depicted in accordance with a preferred embodiment of the present invention. Mobile communications unit 200 includes baseband processor 202, application processor 204, flash/static random access memory (SRAM) 206, flash card 208, radio frequency integrated circuit (RFIC) 210, radio frequency (RF) module 212, antenna 214, Bluetooth module 216, color liquid crystal display (LCD) 218, and IC card 222.

Baseband processor 202 provides for receiver and transmitter operations and is also referred to as a transceiver. In particular, baseband processor 202 handles all of the audio, signal, and data processing needed to receive and send data using RF transmissions, including Bluetooth transmissions. Application processor 204 provides the processing power for other functions within mobile communications unit 200. For example, calculators, calendars, alarms, camera functions, and directories are provided through application processor 204. Flash/SRAM 206 is a storage device in which various instructions for providing the functions within mobile communications unit 200 are located and provide upgrades. Flash card 208 is a storage device in which user data and applications may be stored. An example of flash card 208 is a secure digital card. A user profile may be stored in flash card 208 in these examples. This profile may include a list of languages spoken by the user. In these examples, the language information in the list of languages is accessed when a call is initiated. This information is sent with other caller ID information to a called party.

A pathway for the transmission of voice and other types of data is through RFIC 210. Additionally, short-range transmissions may be sent or received through Bluetooth module 216. Bluetooth module 216 conforms to Bluetooth wireless communication specification, which defines the link layer and application layer for product developers. Both of these transmissions are made through antenna 214 in this illustrative example.

Color LCD 218 provides a display for pictures and other data for mobile communications unit 200. IC card 222 may contain application specific functions, such as a global positioning system (GPS) or other functions, such as a modem or additional memory.

Figure 3:
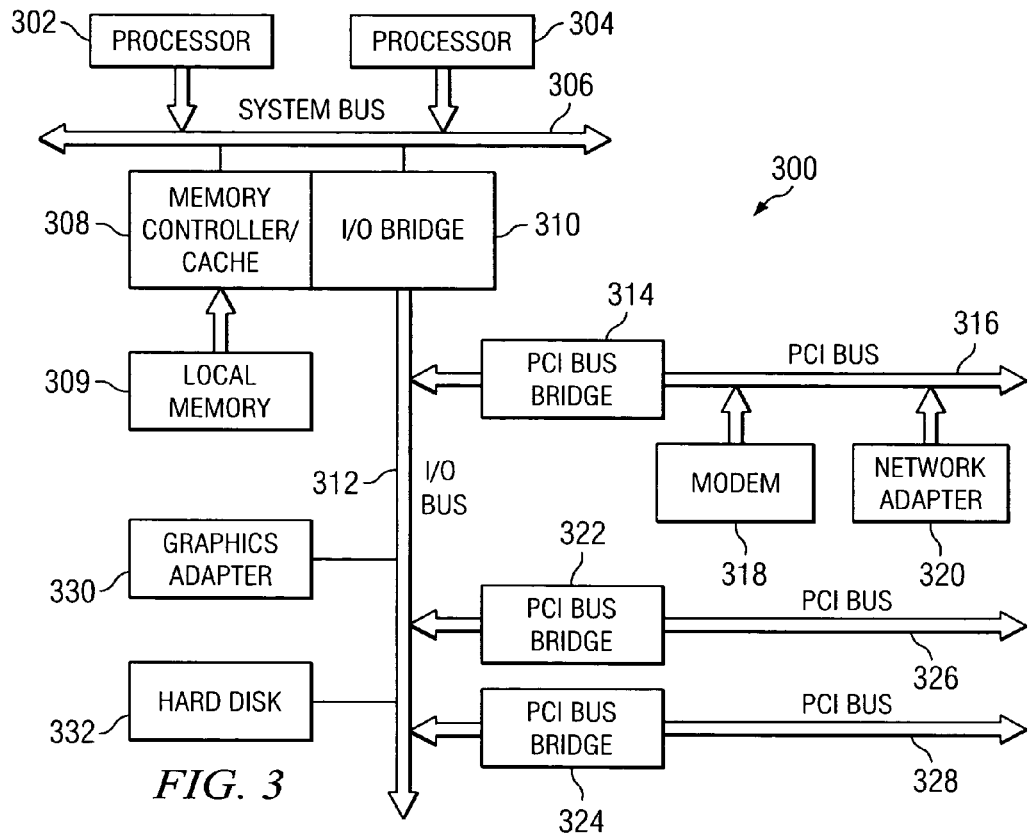
FIG. 3 is a block diagram of a data processing system that may be implemented as a server in accordance with a preferred embodiment of the present invention.

Referring to FIG. 3, a block diagram of a data processing system that may be implemented as a server, such as server 120 in FIG. 1, is depicted in accordance with a preferred embodiment of the present invention. Data processing system 300 may be a symmetric multiprocessor (SMP) system including a plurality of processors 302 and 304 connected to system bus 306. Alternatively, a single processor system may be employed. Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted.

Peripheral component interconnect (PCI) bus bridge 314 connected to I/O bus 312 provides an interface to PCI local bus 316. A number of modems may be connected to PCI local bus 316. Typical PCI bus implementations will support four PCI expansion slots or add-in connectors. Communications links to clients may be provided through modem 318 and network adapter 320 connected to PCI local bus 316 through add-in boards.

Additional PCI bus bridges 322 and 324 provide interfaces for additional PCI local buses 326 and 328, from which additional modems or network adapters may be supported. In this manner, data processing system 300 allows connections to multiple network computers. A memory-mapped graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

Figure 4:
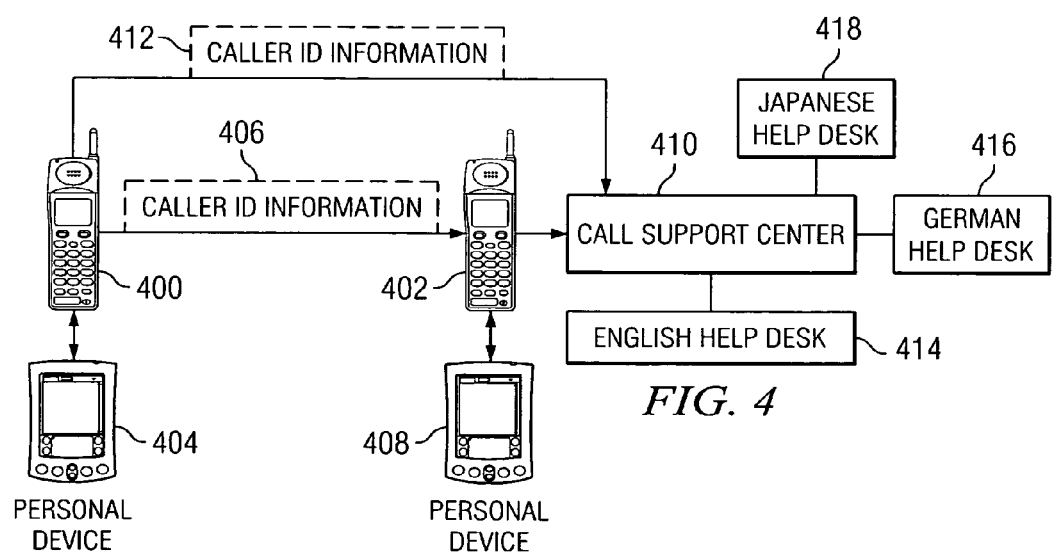
FIG. 4 is a diagram illustrating the sending of caller ID information in accordance with a preferred embodiment of the present invention.

Turning next to FIG. 4, a diagram illustrating the sending of caller ID information is depicted in accordance with a preferred embodiment of the present invention. In the depicted example, mobile communications unit 400 initiates a call to communications unit 402, which also is a mobile communications unit in this example. When the call is initiated, mobile communications unit 400 attempts to obtain a list of spoken languages from personal device 404. In these examples, personal device 404 is a personal digital assistant, which has Bluetooth communication capability to provide a wireless communications link with mobile communications unit 400. This personal device 404 may take many forms and may be, for example, a smart card located within mobile communications unit 400. This information may be located in a profile for the user. If the speaking language can be obtained, the originating country code and language codes are transmitted in caller ID information 406.

Mobile communications unit 402 receives caller ID information 406 and determines whether or not an originating country code or other language code information is present within caller ID information 406. If language information is present, mobile communications unit 402 displays the originating country code information and speaking language information on a caller ID display. This information may be presented in code or may be expanded to recognizable words depending on the capabilities of mobile communications unit 402.

Further, the country code and speaking language information, as well as other caller ID information, may be translated into the language of the calling party or the called party depending on the particular implementation. In determining whether or not the speaking language of the calling party matches the speaking language of the called party, mobile communications unit 402 may retrieve spoken language information from personal device 408. If a match occurs, the call may be displayed in the language matching both the calling party and the called party. Alternatively, if a matching language is absent, a voice recognition, translation, and synthesis process may be executed to allow the called party to translate the incoming call to a chosen language. Further, if a matching language does not exist between the called party and calling party, the call may be forwarded or routed to call support center 410. In this manner, a person speaking the calling party's language may answer the call to help the calling party.

Such a feature is especially useful in businesses in which help desks are present for providing support to customers. Alternatively, a call support center may be added to the call to allow a live person to perform translation between the called party and the calling party. In FIG. 4, mobile communications unit 402 may call support center 410 directly. In this example, call support center 410 may be implemented using a server, such as server 120 in FIG. 1. Call support center 410 may automatically route calls to different help desks, such as English help desk 414, German help desk 416, or Japanese help desk 418, depending on the particular country code and/or language code included with caller ID information 412.

For example, with respect to geographic origin, different help desks may be assigned to different geographic areas. For example, English help desk 414 may be assigned to handle all calls originating from North America, while German help desk 416 is assigned to all calls originating from Europe. Japanese Help desk 418 may be assigned to all calls originating from Asia.

Further, depending on the particular language code, calls may be routed to the appropriate help desks when these help desks are set up based on spoken languages. For example, the caller ID information 412 indicates that the caller at mobile communications unit 400 speaks Japanese, the call may be routed to Japanese help desk 418, regardless of the geographic location of its origin. In this manner, calls may be automatically routed to different help desks or persons. Further, if language information is absent, the call may be routed by call support center 410 to a default help desk, such as English help desk 414.

Figure 5:
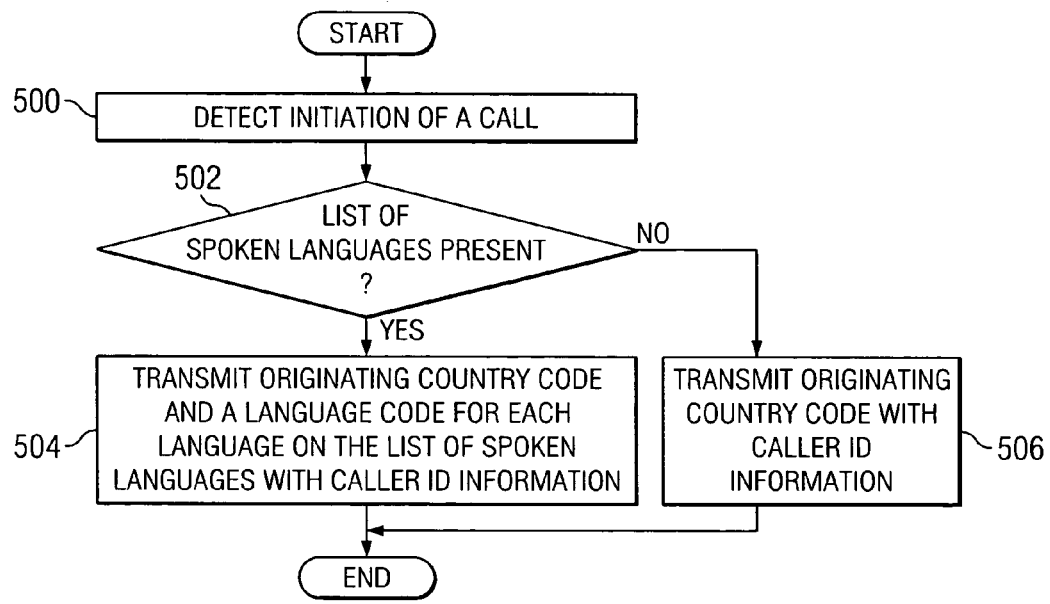
FIG. 5 is a flowchart of a process for initiating a call in accordance with a preferred embodiment of the present invention.

Turning next to FIG. 5, a flowchart of a process for initiating a call is depicted in accordance with a preferred embodiment of the present invention. The process illustrated in FIG. 5 may be implemented in a mobile communications unit, such as mobile communications unit 200 in FIG. 2.

The process begins by detecting initiation of a call (step 500). A determination is made as to whether a list of spoken languages is present (step 502). This determination may be made by querying a storage device or another personal device to see whether language codes are present for the caller. These language codes or language information may be stored in a personal profile for the particular caller. If a list of spoken languages is present, the originating country code and language code for each language in the list of spoken languages is transmitted with the caller ID information (step 504) with the process terminating thereafter.

With reference again to step 502, if a list of spoken languages is absent, then the originating country code is transmitted with the caller ID information (step 506) with the process terminating thereafter.

Figure 6:
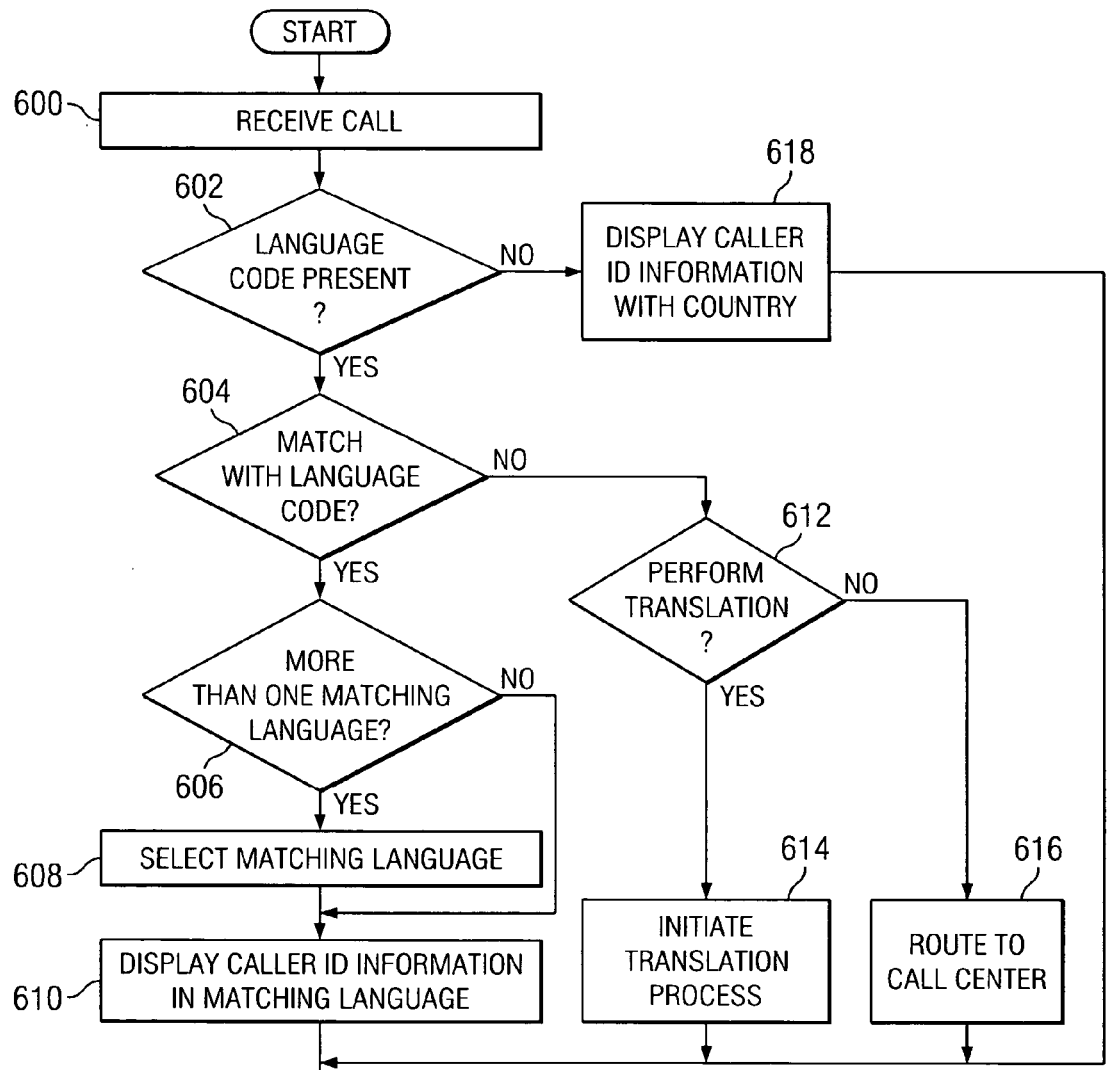
FIG. 6 is a flowchart of a process for receiving a call in accordance with a preferred embodiment of the present invention.

With reference next to FIG. 6, a flowchart of a process for receiving a call is depicted in accordance with a preferred embodiment of the present invention. The process illustrated in FIG. 6 may be implemented in a mobile communications unit, such as mobile communications unit 200 in FIG. 2.

The process begins by receiving a call (step 600). A determination is made as to whether a language code is present in the caller ID information (step 602). If a language code is present, a determination is made as to whether a match is present with the language code for the mobile communications unit (step 604). If a match is present, then a determination is made as to whether more than one matching language is present (step 606). If more than one matching language is present, then one of the matching languages is selected (step 608).

Thereafter, the caller ID information is displayed in the matching language (step 610) with the process terminating thereafter. In step 608, the matching language may be selected in a number of different ways. For example, priorities may be assigned to the different spoken languages by the calling party. In this case, the matching language having the highest priority for the calling party is selected. With reference again to step 606, if more than one matching language is not present, then the process proceeds to step 610 as described above.

Turning back to step 604, if an absence of a match is present with the language codes transmitted by the calling party, a determination is made as to whether to perform a translation of the call (step 612). If the call is to be translated, then a translation process is initiated (step 614). This translation process may be, for example, a computer-based one, depending on the capabilities of the mobile communications unit. Alternatively, the translation process may include adding a live translator to the call. The process terminates thereafter.

Turning again to 612, if a translation process is not to be performed, the call is routed to a call center (step 616) with the process terminating thereafter. In this case, the call center may identify a person to help the caller who speaks one of the languages identified by the language codes. Another alternative to step 616 is to send the caller to an automated call system. These different alternatives are presented for purposes of illustration and are not meant to limit the manner in which calls may be handled using language information transmitted by the calling party.

With reference again to step 602, if a language code is absent, then caller ID information is displayed with the country code (step 618) with the process terminating thereafter. Although no language information is present in this case, the originating country code information may provide the called party with some indication as to the language that might be spoken by the calling party.

Thus, the present invention provides an improved method, apparatus, and computer instructions for managing incoming calls. The mechanism of the present invention provides this improved advantage by transmitting country code and/or language code information as part of the caller ID information in a call. In this manner, a called party may know with some degree of certainty the language or languages spoken by the calling party. In this manner, the called party may answer in a language that is spoken by the calling party. Further, the mechanism of the present invention also is especially useful in managing incoming calls to a call center. The incoming call may be routed to the appropriate person based on the language or country code transmitted in the caller ID information.

Figure 7:
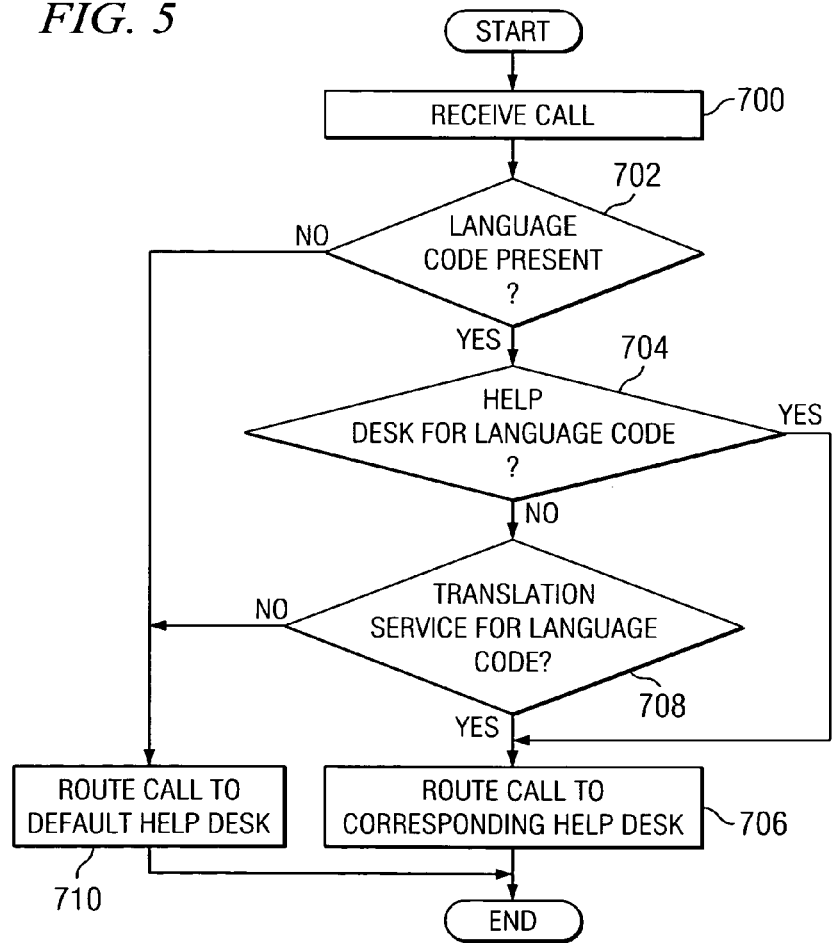
FIG. 7 is a flowchart of a process for managing incoming calls in a call center in accordance with a preferred embodiment of the present invention.

Turning next to FIG. 7, a flowchart of a process for managing incoming calls in a call center is depicted in accordance with a preferred embodiment of the present invention. The process illustrated in FIG. 7 may be implemented in a call support center, such as call support center 410 in FIG. 4.

The process begins by receiving an incoming call (step 700). A determination is made as to whether a language code is present in the caller ID information for the call (step 702). If a language code is present, a determination is made as to whether a help desk corresponding to the language code is present (step 704). If a help desk is present for the language identified in the caller ID information, the call is then routed to the corresponding help desk (step 706) with the process terminating thereafter.

With reference again to step 704, if a help desk corresponding to the language code is absent, a determination is made as to whether a translation service is present for the language identified by the language code (step 708). If a translation service is absent, the call is routed to a default help desk (step 710) with the process terminating thereafter. The call is routed to a default help desk also if a language code is absent in step 702. If a language translation service is present for the language code, the language proceeds to step 706 as described above.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a communications device for initiating calls, the method comprising:
   detecting an initiation of a call in the communications device wherein the call is initiated by a user directly co-acting with the communications device;
   responsive to detecting the call, identifying a geographic identification based on a number assigned to the communications device and a language identification based on the user of the communications device; and
   transmitting the geographic identification and the language identification with caller identification information for use by a called party.

2. The method of claim 1, wherein the language identification is a list of languages in a code format.

3. The method of claim 1, wherein the geographic identification is in a two letter code format.

4. The method of claim 1, wherein the language identification is stored in a user profile for the user.

5. The method of claim 1, wherein the language identification is stored in a device accessible by the communications device using a wireless communication link.

6. The method of claim 1, wherein the device has Bluetooth wireless capability that is used to access the language identification stored in the device.

7. The method of claim 1, wherein the communications device is a mobile communications unit.

8. A method in a communications device for receiving a call, the method comprising:
   responsive to detecting an coming call from a caller, determining whether a geographic identification and a language identification is present, wherein the language identifier identifies at least one language spoken by the caller; and
   responsive to the geographic identification and the language identification being present, presenting the geographic identification and language identification to the called party, wherein the geographic identification and language identification is used to identify the geographic location of the origin of the call and the at least one language spoken by the caller.

9. The method of claim 8 further comprising:

responsive to the language identification being present, determining whether the language identification matches a language selected by the called party.

10. The method of claim 8, wherein the language identification is a list of language codes containing at least one language code indicating a language spoken by the caller.

11. The method of claim 9 further comprising:

responsive to an absence of a matching language, initiating a translation process.

12. The method of claim 9 further comprising:

responsive to an absence of a matching language, forwarding the call to a call center.

\* \* \* \* \*